US008562935B2

(12) United States Patent
Smalley et al.

(10) Patent No.: US 8,562,935 B2
(45) Date of Patent: Oct. 22, 2013

(54) AMPLIFICATION OF CARBON NANOTUBES VIA SEEDED-GROWTH METHODS

(75) Inventors: Richard E. Smalley, Houston, TX (US); Irene M. Marek, legal representative, Houston, TX (US); Robert H. Hauge, Houston, TX (US); Andrew R. Barron, Houston, TX (US); James M. Tour, Bellaire, TX (US); Howard K. Schmidt, Cypress, TX (US); W. Edward Billups, Houston, TX (US); Christopher A. Dyke, Humble, TX (US); Valerie C. Moore, Houston, TX (US); Elizabeth Whitsitt, Houston, TX (US); Robin E. Anderson, Toronto (CA); Ramon Colorado, Jr., Houston, TX (US); Michael P. Stewart, Mountain View, CA (US); Douglas C. Ogrin, Houston, TX (US)

(73) Assignee: William Marsh Rice University, Houston, TX (US)

( * ) Notice: Subject to any disclaimer, the term of this patent is extended or adjusted under 35 U.S.C. 154(b) by 1295 days.

(21) Appl. No.: 10/575,352

(22) PCT Filed: Oct. 14, 2004

(86) PCT No.: PCT/US2004/034002
§ 371 (c)(1),
(2), (4) Date: Jan. 31, 2008

(87) PCT Pub. No.: WO2005/085132
PCT Pub. Date: Sep. 15, 2005

(65) Prior Publication Data
US 2008/0213162 A1 Sep. 4, 2008

Related U.S. Application Data

(60) Provisional application No. 60/511,175, filed on Oct. 14, 2003, provisional application No. 60/587,234, filed on Jul. 12, 2004, provisional application No. 60/598,630, filed on Aug. 4, 2004.

(51) Int. Cl.
D01F 9/127 (2006.01)

(52) U.S. Cl.
USPC .............. 423/447.3; 423/447.1; 977/742; 977/743; 977/843; 977/845; 977/848

(58) Field of Classification Search
USPC ........ 423/447.1–447.3, 445 B; 977/742–754, 977/842–848; 428/367
See application file for complete search history.

(56) References Cited

U.S. PATENT DOCUMENTS 5,374,415 A 12/1994 Alig et al.
6,413,487 B1 * 7/2002 Resasco et al. ............ 423/447.3
(Continued)

FOREIGN PATENT DOCUMENTS

WO WO 03/084869 10/2003
WO 2005012172 2/2005

OTHER PUBLICATIONS

Gu, et al., Cutting Single-Wall Carbon Nanotubes through Fluorination, Nano Letters 2002; 2(9): 1009-1013.*

(Continued)

Primary Examiner — Daniel C McCracken
(74) Attorney, Agent, or Firm — Winstead PC

(57) ABSTRACT

The present invention is directed towards methods (processes) of providing large quantities of carbon nanotubes (CNTs) of defined diameter and chirality (i.e., precise populations). In such processes, CNT seeds of a pre-selected diameter and chirality are grown to many (e.g., hundreds) times their original length. This is optionally followed by cycling some of the newly grown material back as seed material for regrowth. Thus, the present invention provides for the large-scale production of precise populations of CNTs, the precise composition of such populations capable of being optimized for a particular application (e.g., hydrogen storage). The present invention is also directed to complexes of CNTs and transition metal catalyst precursors, such complexes typically being formed en route to forming CNT seeds.

40 Claims, 8 Drawing Sheets

(56) References Cited

U.S. PATENT DOCUMENTS

| | | | |
|---|---|---|---|
| 7,727,504 B2* | 6/2010 | Kittrell et al. | 423/447.3 |
| 2002/0004028 A1* | 1/2002 | Margrave et al. | 423/447.3 |
| 2004/0038251 A1* | 2/2004 | Smalley et al. | 435/6 |
| 2004/0040834 A1* | 3/2004 | Smalley et al. | 204/164 |
| 2007/0009421 A1* | 1/2007 | Kittrell et al. | 423/447.3 |

OTHER PUBLICATIONS

An, et al., Synthesis of Nearly Uniform Single-Walled Carbon Nanotubes Using Identical Metal-Containing Molecular Nanoclusters as Catalysts, J. Am. Chem. Soc. 2002; 124(46): 13688-13689.*
Dillon, et al., Hydrogen storage using carbon adsorbents: past, present and future, Appl. Phys. A 2001; 72: 133-142.*
Muller, at al., A New Type of Supramolecular Compound: Molybnedum-Oxide-Based Composites Consisting of Magnetic Nanocapsules with Encapsulated Keggin-Ion Electron Reservois Cross-Linked to a Two-Dimensional Network, Agnew. Chem. 2000; 122(19):1555-1559.*
Strano, et al., Electronic Structure Control of Single-Walled Carbon Nanotube Functionalization, Science 2003; 301: 1519-1522.*
"Robert H. Hauge" accessed online at <http://chemistry.rice.edu/FacultyDetail.aspx?RiceID=605> on Jun. 16, 2013.*
"James M Tour Group" accessed online at <http://www.jmtour.com/> on Jun. 16, 2013.*
Strano et al., "Electronic structure control of single-walled carbon nanotube functionalization", 301 Science (2003), pp. 1519-1522.
An et al., "Synthesis of nearly uniform single-walled carbon nanotubes using identical metal-containing..", 124 J. Am. Chem. Soc. (2002), pp. 13688-13689.
International Preliminary Report on Patentability, (PCT/US04/034002), dated Jan. 17, 2007.
Nikolaev et al., "Gas-phase catalytic growth of single-walled carbon nanotubes from carbon monoxide", Chem. Phys. Lett. 1999, 313, 91-97.
Dresselhaus et al, "Science of Fullerenes and Carbon Nanotubes", Academic Press, San Diego, 1996.
Bronikowski et al., "Gas phase production of carbon single-walled nanotubes from carbon monoxide via the HiPco process: A parametric strudy", Journal of Vacuum Science & Technology 2001, 19, 1800-1805.
R. Saito et al, "Physical properties of carbon nanotubes", Imperial College Press, London, 1998.
Strano et al.,"Assignment of (n, m) raman and optical features of metallic single-walled carbon nanotubes", Nano Letters, 2003, 3, 8, 1091-1096.
O'Connell et al., "Band gap fluorescence from individual single-walled carbon nanotubes", Science, 2002, 297, 593-596.
Bachilo et al., "Structure-assigned optical spectra of single-walled carbon nanotubes", Science, 2002, 298, 2361-2366.
Strano et al, "The role of surfactant adsorption during ultrasonication in the dispersion of single-walled carbon nanotubes", J. Nanosci. Nanotech, 2003, 3, 81-86.
Thess et al., "Crystalline ropes of metallic carbon nanotubes", Science, 1996, 273, 483-487.
Liu et al., "Fullerene Pipes", Science, 1998, 280, 1253-1256.
Chen et al., "Solution properties of single-walled carbon nanotubes", Science, 1998, 282, 95-98.
Khabashesku et al., "Fluorination of single-wall carbon nanotubes and subsequent derivatization reactions", Acc. Chem. Res., 2002, 35, 1087-1095.
Holzinger et al., "Sidewall functionalization of carbon nanotubes", Angew. Chem. Int. Ed., 2001, 40, 4002-4005.
Ying et al., "Functionalization of carbon nanotubes by free radicals", Org. Letters, 2003, 5, 1471-1473.
Bahr et al., "Functionalization of carbon nanotubes by electrochemical reduction of aryl diazonium salts: a bucky paper electrode", J. Am. Chem. Soc., 2001, 123, 6536-6542.
Kamaras et al., "Covalent bond formation to a carbon nanotube metal", Science, 2003, 301, 1501.
S. Niyogi et al., "chemisgry of single-walled carbon nanotubes", Acc. of Chem. Res., 2002, 35, 1105-1113.
D. Chattopadhyay et al., "A route for bulk separation of semiconducting from metallic single-wall carbon nanotubes", J. Am. Chem. Soc., 2003, 125, 3370-3375.
M. Zheng et al., "Structure-based carbon nanotube sorting by sequence-dependent DNA assembly", Science, 2003, 302, 1545-1548.
Weisman, "Carbon nanotubes: Four degrees of separation", Nat. Mater., 2003, 2, 569-570.
L. An et al., "A simple chemical route to selectively eliminate metallic carbon nanotubes in nanotube rework devices", J. Am. Chem. Soc., 2004, 126(34), 10520-10521.
Chiang et al., "Purification and characterization of single-wall carbon nanotubes", J. Phys. Chem. B 2001, 105, 1157-1161.
Chiang et al., Purification and characterization of single-wall carbon nanotubes (SWNTs) obtained from the gas-phase decomposition of CO (HiPco Process), J. Phys. Chem. B 2001, 105, 8297-8301.
O'Connell et al., "Reversible water-solubilization of single-walled carbon nanotubes by polymer wrapping", Chem. Phys. Lett., 2001, 342, 265-271.
Gu et al., "Cutting single-wall carbon nanotubes through fluorination", Nano Lett., 2002, 2, 1009-1013.
Ramesh et al., "Dissolution of pristine single-walled carbon nanotubes in superacids by direct protonation", J. Phys. Chem. B, 2004, 108, 8794-8798.
Kelly et al., "Insight into the mechanism of sidewall functionalization of single-walled nanotubes: an STM study", Chem. Phys. Lett., 1999, 313, 445-450.
Banerjee et al., "rational sidewall functionalization and purification of single-walled carbon nanotubes by solution-phase ozonolysis", J. Phys. Chem. B, 2002, 106, 12144-12151.
Zheng et al., "DNA-assisted dispersion and separation of carbon nanotubes", Nature Mater., 2003, 2, 338-342.
Krupke et al., "Separation of metallic from semiconducting single-walled carbon nanotubes", Science, 2003, 301, 344-347.
Chen et al., "Buld separative enrichment in metallic or semiconducting single-walled carbon nanotubes", Nano Lett., 2003, 3, 1245-1249.
Dyke et al., "Diazonium-based functionalization of carbon nanotubes: XPS and GC-MS and mechanistic implications", Synlett., 2004, 1, 155-160.
Hafner et al., "Catalytic growth of single-wall carbon nanotubes from metal particles", Chem. Phys. Lett., 1998, 296, 195-202.
Dyke et al., "Unbundled and highly functionalized carbon nanotubes from aqueous reactions", Nano Letters, 2003, 3, 1215-1218.
Strano et al, "Reversible, band-gap-selective protonation of single-walled carbon nanotubes in solution", J. Phys. Chem B, 2003, 107, 6979-6985.
Saini et al, "Covalent sidewall functionalization of single wall carbon nanotubes", J. Am. Chem. Soc., 2003, 125, 3617-3621.
Ramesh et al, "Identification of large fullerenes formed during the growth of single-walled carbon nanotubes in the HiPco process", J. Phys. Chem. B, 2003, 107, 1360-1365.
Bahr et al., "Functionalization of Carbon Nanotubes by Electrochemical Reduction of Aryl Diazonium Salts: A Bucky Paper Electrode", J. Am. Chem. Soc., 123, 6536, (2001).
Ward, "Molecular Fuel Tanks", Science, 300, 1104, (2003).
Dagani, "Tempest in a Tiny Tube", C&E News, 80(2), 25, (2002).
Lueking, et al, "Hydrogen spillover from a metal oxide catalyst onto carbon nanotubes—implications for hydrogen storage", J. Catal., 2006, 165, (2002).
Yang, et al., "Ab initio molecular orbital study of adsorption of atomic hydrogen on graphite: insight into hydrogen storage in carbon nanotubes", Carbon, 40, 437, (2002).
Gu et al, "Cutting single-wall carbon nanotubes through fluorination", Nano Lett., 2, 1009, (2002).
Muller, et al., "A new type of supramolecular compound: molybdenum-oxide-based composites consisting of magnetic nanocapsules with encapsulated keggin-ion electron reservoirs, cross-linked to a two-dimensional network", Angew. Chem. Int. Ed., 39, 3414, (2000).

(56) References Cited

OTHER PUBLICATIONS

Bethune et al., "Cobalt-catalysed growth of carbon nanotubes with single-atomic-layer walls", Nature, 363, 605, (1993).

Yakobson et al., "Fullerene nanotubes: C1,000,000 and beyond", Science, 85, 324, (1997).

Muller et al., "Linking icosahedral, strong molecular magnets to Layers—A solid-state reaction at room temperature", Angew. Chem. Int. Ed., 39, 1612, (2000).

Li et al., "Preparation of monodispersed fe-mo nanoparticles as the catalyst for cvd synthesis of carbon nanotubes", Chem. Mater., 13, 1008, (2001).

* cited by examiner

AMPLIFICATION OF CARBON NANOTUBES VIA SEEDED-GROWTH METHODS

CROSS REFERENCE TO RELATED APPLICATIONS

This Application claims priority to the following U.S. Provisional Patent Applications: Ser. No. 60/511,175, filed Oct. 14, 2003; Ser. No. 60/587,234, filed Jul. 12, 2004, and Ser. No. 60/598,630, filed Aug. 4, 2004.

The present invention was made with government support under Grant No. DMR-0073046, awarded by the National Science Foundation; and Grant No. F33615-01-D-5802, awarded by the United States Air Force. The government has certain rights in the invention.

FIELD OF THE INVENTION

The present invention relates generally to carbon nanotube materials. More specifically, the invention relates to methods of growing carbon nanotube materials from pre-grown nanotube seeds comprising catalyst metal, the seeds having a particular size and electronic diversity or homogeneity such that the size and electronic diversity and/or homogeneity is preserved upon amplification.

BACKGROUND OF THE INVENTION

Carbon nanotubes (CNTs), comprising multiple concentric shells and termed multi-wall carbon nanotubes (MWNTs), were discovered by Iijima in 1991 [Iijima, *Nature* 1991, 354, 56]. Subsequent to this discovery, single-wall carbon nanotubes (SWNTs), comprising single graphene sheets rolled up on themselves to form cylindrical tubes with nanoscale diameters, were synthesized in an arc-discharge process using carbon electrodes doped with transition metals [Iijima, S.; Ichihashi, T. *Nature* 1993, 363, 603; and Bethune et al. *Nature* 1993, 363, 605]. These carbon nanotubes (especially SWNTs) posses unique mechanical, electrical, thermal and optical properties, and such properties make them attractive for a wide variety of applications. See Baughman et al., *Science*, 2002, 297, 787-792.

The diameter and chirality of CNTs are described by integers "n" and "m," where (n,m) is a vector along a graphene sheet which is conceptually rolled up to form a tube. When $|n-m|=3q$, where q is an integer, the CNT is a semi-metal (bandgaps on the order of milli eV). When $n-m=0$, the CNT is a true metal and referred to as an "armchair" nanotube. All other combinations of n-m are semiconducting CNTs with bandgaps in the range of 0.5 to 1.5 eV. See O'Connell et al., *Science*, 2002, 297, 593. CNT "type," as used herein, refers to such electronic types described by the (n,m) vector (i.e., metallic, semi-metallic, and semiconducting). CNT "species," as used herein, refers to CNTs with a particular (n,m) value.

Methods of making CNTs include the following techniques: arc discharge [Ebbesen, *Annu. Rev. Mater. Sci.* 1994, 24, 235-264]; laser oven [Thess et al., *Science* 1996, 273, 483-487]; flame synthesis [Vander Wal et al., *Chem. Phys. Lett.* 2001, 349, 178-184]; and chemical vapor deposition [U.S. Pat. No. 5,374,415], wherein a supported [Hafner et al., *Chem. Phys. Lett.* 1998, 296, 195-202] or an unsupported [Cheng et al., *Chem. Phys. Lett.* 1998, 289, 602-610; Nikolaev et al., *Chem. Phys. Lett.* 1999, 313, 91-97] metal catalyst may also be used.

All known CNT preparative methods lead to polydisperse CNT materials of semiconducting, semimetallic, and metallic electronic types. See M. S. Dresselhaus, G. Dresselhaus, P. C. Eklund, *Science of Fullerenes and Carbon Nanotubes,* Academic Press, San Diego, 1996; Bronikowski et al., *Journal of Vacuum Science & Technology* 2001, 19, 1800-1805; R. Saito, G. Dresselhaus, M. S. Dresselhaus, *Physical Properties of Carbon Nanotubes,* Imperial College Press, London, 1998. Recent advances in the solution phase dispersion [Strano et al., *J. Nanosci. and Nanotech.*, 2003, 3, 81; O'Connell et al., *Science,* 2002, 297, 593-596] along with spectroscopic identification using bandgap fluorescence [Bachilo et al., *Science,* 2002, 298, 2361] and Raman spectroscopy [Strano, *Nanoletters* 2003, 3, 1091] have greatly improved the ability to monitor electrically distinct nanotubes as suspended mixtures and have led to definitive assignments of the optical features of semiconducting [Bachilo et al., *Science,* 2002, 298, 2361], as well as metallic and semi-metallic species [Strano, *Nanoletters,* 2003, 3, 1091].

Techniques of chemically functionalizing CNTs have greatly facilitated the ability to manipulate these materials, particularly for SWNTs which tend to assemble into rope-like aggregates [Thess et al., *Science,* 1996, 273, 483-487]. Such chemical functionalization of CNTs is generally divided into two types: tube end functionalization [Liu et al., *Science,* 1998, 280, 1253-1256; Chen et al., *Science,* 1998, 282, 95-98], and sidewall functonalization [PCT publication WO 02/060812 by Tour et al.; Khabashesku et al., *Acc. Chem. Res.,* 2002, 35, 1087-1095; and Holzinger et al., *Angew. Chem. Int Ed.,* 2001, 40, 4002-4005], and can serve to facilitate the debundling and dissolution of such CNTs in various solvents. Scalable chemical strategies have been, and are being, developed to scale up such chemical manipulation [Ying et al., *Org. Letters,* 2003, 5, 1471-1473, Bahr et al., *J. Am. Chem. Soc.,* 2001, 123, 6536-6542; and Kamaras et al., *Science,* 2003, 301, 1501].

Carbon nanotube chemistry has been described using a pyramidization angle formalism [S. Niyogi et al., *Acc. of Chem. Res.,* 2002, 35, 1105-1113]. Here, chemical reactivity and kinetic selectivity are related to the extent of s character due to the curvature-induced strain of the $sp^2$-hybridized graphene sheet. Because strain energy per carbon is inversely related to nanotube diameter, this model predicts smaller diameter nanotubes to be the most reactive, with the enthalpy of reaction decreasing as the curvature becomes infinite. While this behavior is most commonly the case, the role of the electronic structure of the nanotubes in determining their reactivity is increasingly important—especially when desiring selectivity among a population of similar-diameter CNTs (such as is often the case with SWNT product). Furthermore, because such structure is highly sensitive to chiral wrapping, chemical doping, charged adsorbates, as well as nanotube diameter, there exists a considerable diversity among these various pathways in addition to a simple diameter dependence, and with implications for separating CNTs by type.

Methods for separating CNTs by electronic type have been reported. See D. Chattopadhyay et al., *J. Am. Chem. Soc.,* 2003, 125, 3370; M. Zheng et al., *Science,* 2003, 302, 1545-1548; Weisman, *Nat. Mater.,* 2003, 2, 569-570; and commonly assigned, co-pending U.S. patent applications Ser. Nos. 10/379,022 and 10/379,273, both filed Mar. 4, 2003. Additionally, methods for selectively functionalizing CNTs by type have also emerged. See Strano et al., *Science,* 2003, 301, 1519-1522; L. An et al., *J. Am. Chem. Soc.,* 2004, 126 (34), 10520-10521; and commonly assigned, co-pending International Patent Application Serial No. PCT US04/24507, filed Jul. 29, 2004.

While separation of CNTs by type is now a reality, there is still no method for producing large quantities of CNTs having a precisely defined type or range of types (i.e., homogeneous or a particularly-defined range or plurality of types), referred to hereinafter as a "precise population" of CNTs, as all such separation methodologies are carried out on the microscale. In view of the broad range of applications that could potentially benefit from such bulk quantities of CNTs of precise population, a method of "amplifying" the production of such precise populations would be extremely beneficial.

BRIEF DESCRIPTION OF THE INVENTION

The present invention is directed towards methods (processes) of providing large quantities of carbon nanotubes (CNTs) of defined diameter and chirality (i.e., precise populations). In such processes, CNT seeds of a pre-selected diameter and chirality are grown to many (e.g., hundreds) times their original length. This is optionally followed by cycling some of the newly grown material back as seed material for regrowth. Thus, the present invention provides for the large-scale production of precise populations of CNTs, the precise composition of such populations capable of being optimized for a particular application (e.g., hydrogen storage). The present invention is also directed to complexes of CNTs and transition metal catalyst precursors, such complexes typically being formed en route to forming CNT seeds.

The methods of the present invention are generally broken down into a number of steps including: (a) cutting a plurality of CNTs to provide cut CNTs comprising lengths on the order of tens of nanometers; (b) sorting the cut CNTs by type to provide sorted cut CNTs; (c) docking the sorted cut CNTs to metal catalyst precursors to form CNT seeds; and (d) growing the CNT seeds to form a CNT product of increased length, i.e., an amplified product. Such material can then be severed from the seeds and recycled back into the process. Such methods are referred to herein by the terms, "cloning," "replication," "amplification," and "seeded growth."

The cutting process typically involves one or more oxidative treatments of the CNTs. Sorting is typically carried out by one or more of the foregoing separation methods. Typically, such sorting is carried out post-cutting. That amplified material can be recycled back into the process permits such to be done on small scales (e.g., microscale).

In some embodiments, docking the CNTs to metal catalyst precursors first involves a chemical derivatization of the CNT ends. These CNT ends are derivatized so as to comprise end functionality capable of coupling (attaching) to an organometallic species comprising metal catalyst precursor species, wherein such coupling comprises an interaction selected from the group consisting of Lewis acid-base interactions, hydrogen bonding, ionic forces, van der Waal forces, and combinations thereof. Once attached, these catalyst precursor materials can be reductively "docked" to the CNT end by heating in a reducing atmosphere (e.g., $H_2$). Finally, carbon feedstock gas is introduced at suitable growth conditions to grow (i.e., replicate) the seed material.

An exemplary organometallic species for the above-described embodiments includes, but is not limited to, transition metal cluster: $H_xPMo_{12}O_{40} \subset H_4Mo_{72}Fe_{30}(O_2CMe)_{15}O_{254}(H_2O)_{98}$, referred to herein as "FeMoC." Such FeMoC species can complex with carboxylate end-derivatized CNTs via displacement of $H_2O$ in the metal cluster with —C(O)OH species on the CNT ends.

Depending on the embodiment, the seeded growth methods can be carried out on a support or in a gas stream as an aerosol of CNT seed particles. Thus, re-growth can be carried out with CNT seeds dispersed on supports or by injection of seeds into the gas phase of a growth reactor.

While many of the embodiments and examples put forth herein describe methods for the seeded growth of single-wall carbon nanotubes (SWNTs), it sould be understood that such methods also provide for the replication of multi-wall carbon nanotubes (MWNTs), particularly double-wall carbon nanotubes (DWNTs), as well.

An exemplary application potentially benefiting from such seeded growth methods is hydrogen storage. Of all carbon materials, single-wall carbon nanotubes provide the highest possible surface-to-mass ratio, as well as access to both the inner and outer surfaces of open-ended SWNTs. In principal, because of its surface-to-mass ratio, SWNTs should be the best possible carbon material for hydrogen storage. The optimum adsorption of such $H_2$ on (or within) SWNTs is likely a function of the SWNT diameter and chirality. Finding the optimum type and/or species, and generating bulk quantities of this precise population, will thereby increase the utility of SWNTs in hydrogen storage applications.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
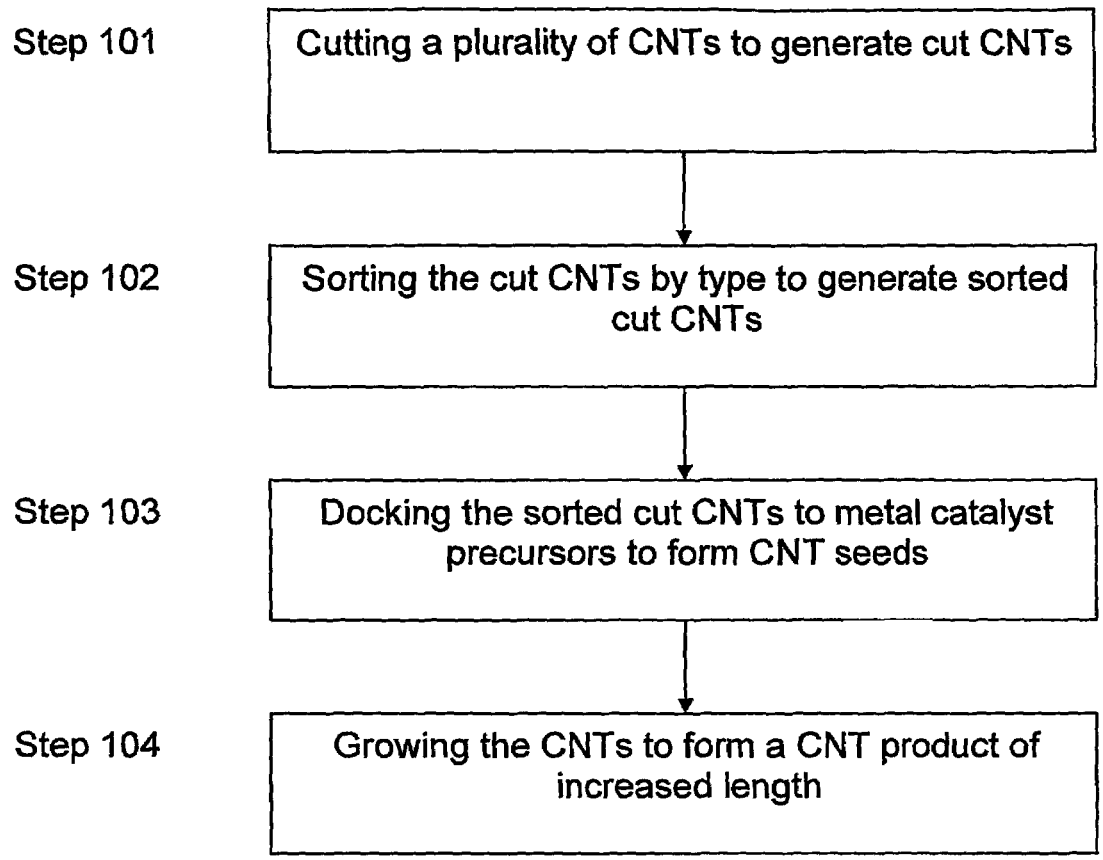
FIG. 1 is a flow diagram illustrating a process of seeded growth amplification of carbon nanotubes in accordance with some embodiments of the present invention.

In the following description, specific details are set forth such as specific quantities, sizes, etc. so as to provide a thorough understanding of embodiments of the present invention. However, it will be obvious to those skilled in the art that the present invention may be practiced without such specific details. In many cases, details concerning such considerations and the like have been omitted inasmuch as such details are not necessary to obtain a complete understanding of the present invention and are within the skills of persons of ordinary skill in the relevant art.

Referring to the drawings in general, it will be understood that the illustrations are for the purpose of describing a particular embodiment of the invention and are not intended to limit the invention thereto.

The present invention is directed towards methods (processes) of providing large quantities of carbon nanotubes (CNTs) of defined diameter and chirality (i.e., precise populations). In such processes, CNT seeds of a pre-selected diameter and chirality are grown to many (e.g., hundreds) times their original length. This is optionally followed by cycling some of the newly grown material back as seed material for regrowth. Thus, the present invention provides for the large-scale production of precise populations of CNTs, the precise composition of such populations capable of being optimized for a particular application (e.g., hydrogen storage). The present invention is also directed to complexes of CNTs and transition metal catalyst precursors, such complexes typically being formed en route to forming CNT seeds, and referred to herein as "CNT-cluster complexes."

Referring to FIG. 1, the amplification methods of the present invention are generally broken down into a number of steps, the steps being: (Step 101) cutting a plurality of CNTs to provide cut CNTs comprising lengths on the order of tens of nanometers (i.e., from about 10 nm to about 100 nm); (Step 102) sorting the cut CNTs by type to provide sorted cut CNTs; (Step 103) docking the sorted cut CNTs to metal catalyst precursors to form CNT seeds; and (Step 104) growing the CNT seeds to form a CNT product of increased length. Such methods are referred to herein by the terms, "cloning," "replicabon," "amplification," and "seeded growth."

Carbon nanotubes (CNTs), according to the present invention, include, but are not limited to, single-wall carbon nanotubes (SWNTs), multi-wall carbon nanotubes (MWNTs), double-wall carbon nanotubes (DWNTs), buckytubes, fullerene tubes, tubular fullerenes, graphite fibrils, and combinations thereof. Such carbon nanotubes can initially be of a variety and range of lengths, diameters, number of tube walls, chiralities (helicities), etc., and can generally be made by any known technique. The terms "carbon nanotube" and "nanotube" will be used interchangeably herein.

Depending on the embodiment, the CNTs can be subjected to one or more purification steps. Exemplary purification techniques include, but are not limited to, those by Chiang et al. [Chiang et al., *J. Phys. Chem. B* 2001, 105, 1157-161; Chiang et al., *J. Phys. Chem. B* 2001, 105, 8297-8301].

In some embodiments, the sidewalls of the CNTs are protected via chemical derivatization [Ying et al., *Org. Letters*, 2003, 5, 1471-1473, Bahr et al., *J. Am. Chem. Soc.*, 2001, 123, 6536-6542; and Kamaras et al., *Science*, 2003, 301, 1501] and/or polymer wrapping [O'Connell et al., *Chem. Phys. Lett.*, 2001, 342, 265-271], during one or more steps of an amplification method. The foregoing references are but examples. Suitable protective groups to impart the CNT sidewalls with include, but are not limited to, halogen, nitro, cyano, alkyl, aryl, arylalkyl, carboxylic ester, thiocarbonate, sulfonate, amide, alkoxy, polyether, and combinations thereof. The functional group may be chosen to be inert to the metal catalyst precursor with regard strong interactions. Deprotection can be by thermal and/or chemical means.

While many of the embodiments and examples put forth herein describe methods for the seeded growth of single-wall carbon nanotubes (SWNTS), it should be understood that these are but exemplary embodiments and that such methods can also provide for the replication of, for example, multi-wall carbon nanotubes (MWNTs), particularly double-wall carbon nanotubes (DWNTs), as well.

Cutting Single Wall Carbon Nanotubes

The cutting step typically involves one or more oxidative treatments of the CNTs, such cutting being of particular relevance to SWNTs. Cutting processes for SWNTs, that can be utilized for the present invention, are ideally low-cost, efficient and scaleable to multi-kilogram quantities. A characteristic of SWNTs is that the fundamental tubes bind into long ropes of ~30 to 200 nm diameter. Thus, many nanotubes are not accessible to chemicals that do not penetrate the SWNT-rope super-lattice. A requirement for cutting processes is that the chemicals have to be able to access the sidewalls of all nanotubes. Thus, for efficient cutting, nanotubes must be dispersed as individuals or the chemicals must be able to penetrate into the rope super-lattice. Alternatively, the rope super-lattice may be expanded with sidewall functionalization so that reactive chemicals will penetrate the ropes.

While cutting of SWNTs has been reported in oxidizing acid solutions [Liu et al., *Science*, 1998, 280, 1253-1256], such cutting is believed to occur only at sidewall defects. This is coupled with a likely shortening at the SWNT ends.

As described herein, cutting should occur anywhere along the length of a nanotube, not only at sidewall defect sites. Experience has shown that free radicals readily add to the sidewalls of SWNTs. Thus, chemicals most useful in cutting are those that react through a free radical mechanism and ultimately produce soluble or volatile carbon species.

Two gaseous reagents that can be used in cutting SWNTs are elemental fluorine and ozone. Fluorine has the advantage of being able to penetrate into ropes in a manner similar to the way it intercalates into graphite [Gu et al., *Nano Lett.*, 2002, 2, 1009-1013], thus having ready access all nanotubes in a rope. Other chemicals that are also known to intercalate graphite such as sulfuric acid, and superacids may be useful as cutting agents or as carriers for cutting agents. See Ramesh et al., *J. Phys. Chem. B*, 2004, 108, 8794-8798. Ozone does not readily penetrate into the rope super-lattice, but does react at room temperature with nanotubes on rope surfaces. Cutting processes that use ozone require that nanotubes be pre-dispersed and/or that the rope lattice be expanded via sidewall functionalization.

Figure 2:
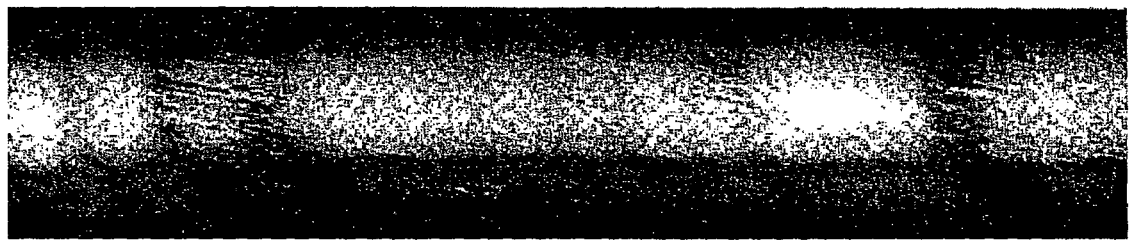
FIG. 2 is a scanning tunneling microscopy scan revealing that fluorination of SWNTs can occur in bands.
Figure 3:
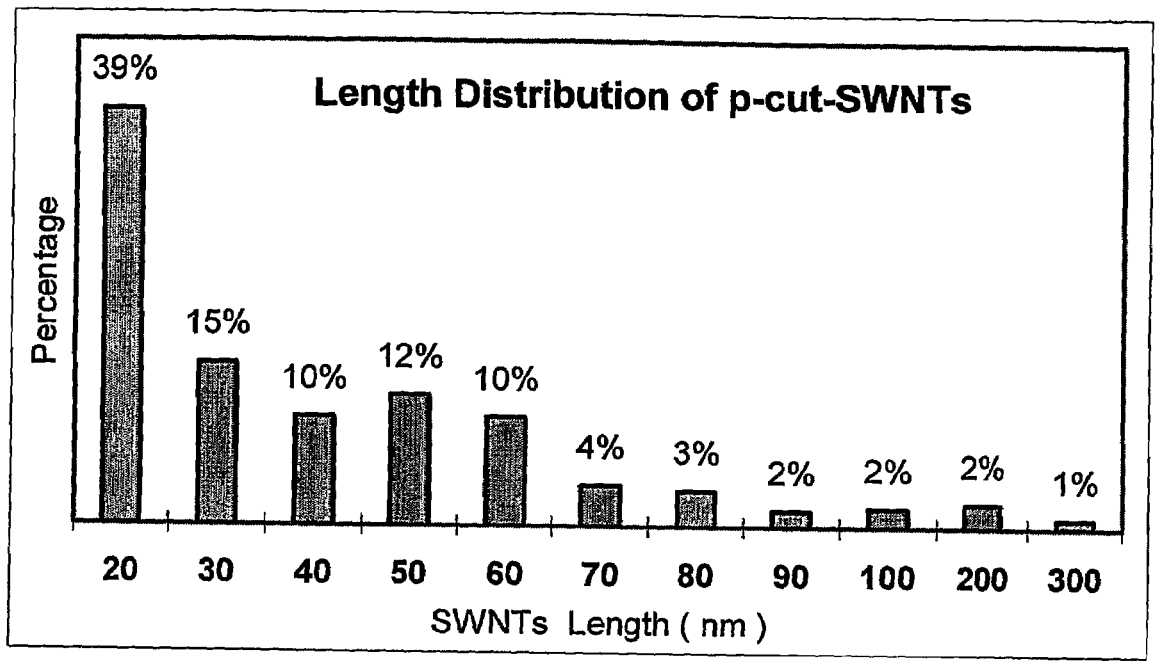
FIG. 3 depicts a graph of the lengths that result from heating partially fluorinated SWNTs.

Fluorination of SWNTs has been shown to occur in bands as is illustrated in the scanning tunneling microscopy scan shown in FIG. 2 [Kelly et al., *Chem. Phys. Lett.*, 1999, 313, 445-450]. When partially fluorinated SWNTs are heated to ~600° C., many short lengths of nanotubes are formed as a result of the gasification of the fluorinated regions. FIG. 3 depicts a graph of the lengths that result from heating partially fluorinated SWNTs. Clearly, cutting is extensive and lengths on the order of tens of nanometers are readily obtained.

Recent work by Applicant has shown that individual SWNTs, roughly one micron in length, can be obtained with intense sonication of SWNTs in surfactant-water mixtures. This has led to a much better understanding of the dependence of electronic structure on nanotube chirality. Recent work has also shown that individual nanotubes in such a surfactant-water suspension can be cut with ozone [Banerjee et al., *J. Phys. Chem. B*, 2002, 106, 12144-12151]. However, cutting from such a process has not been shown to be as extensive as with fluorine.

Extensive sidewall functionalization of nanotubes has been recently accomplished using chemical methods that produce intermediate free radical species. [Ying et al., *Org. Letters*, 2003, 5, 1471-1473, Bahr et al., *J. Am. Chem. Soc.*, 2001, 123, 6536-6542] Furthermore, such methods appear scalable to kilogram quantities. Thus, in some embodiments, functionalized SWNTs, with a lattice structure that is open (by virtue of having be sidewall functionalized) to infusion of oxidants such as ozone, provide alternative routes to cutting. While not intending to be bound by theory, ozone is believed to react primarily with areas that are not sterically protected by functional groups. Other potential cutting methods include electron beam and ion beam cutting methods.

Sorting Single Wall Carbon Nanotubes

Sorting the carbon nanotubes by type can be utilized for supplying the seeds that are to be amplified into large quantities of identical cloned nanotubes. Typically, such sorting is done post-cutting.

While at first glance it might be assumed that the curved graphene sheets of CNTs will, irrespective of species or type, present rather similar sidewalls to approaching reagents, differentiated only by strain energy. A considerable difference in reactivity, however, has been observed for SWNTs in a number of ways, including something as simple as a response to changing acid/base conditions in micelle/water suspensions. See Bachilo et al., *Science*, 2002, 298, 2361-2366; O'Connell et al., *Science*, 2002, 297, 593-596.

Figure 4:
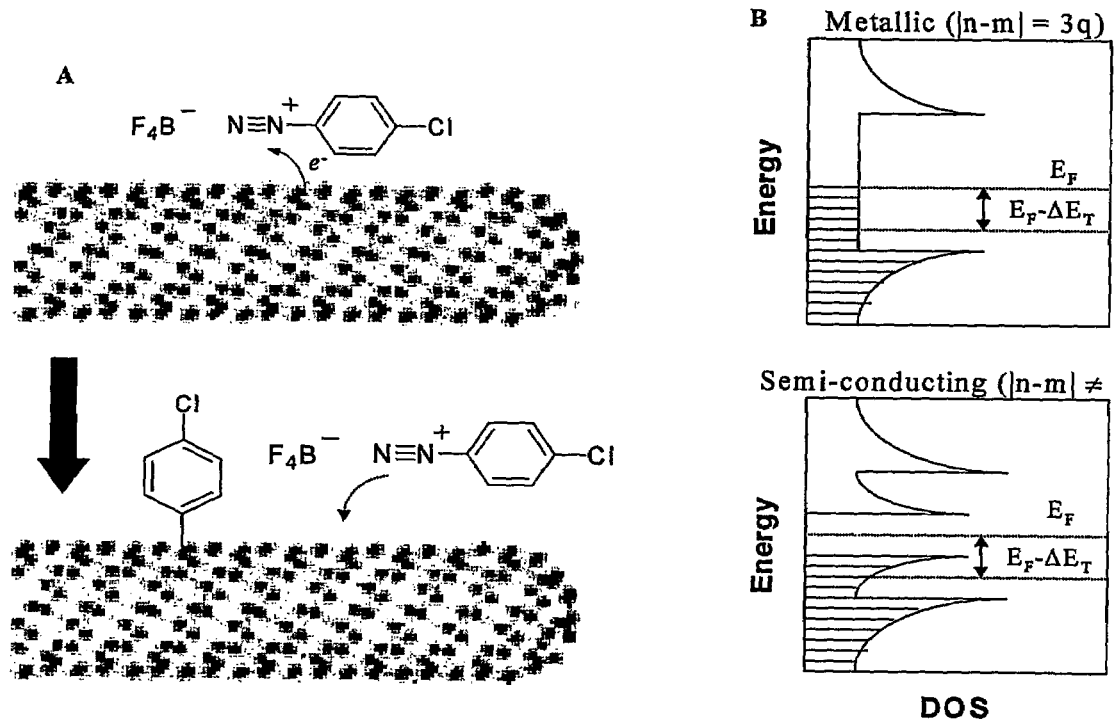
FIGS. 4 A and B depict (A) a nanotube functionalization mechanism whereby a diazonium moiety migrates to the surface of the SWNT, the positive charge on the nitrogen end attracts an electron from the nanotube which stabilizes the transition state as the nitrogen molecule departs, and the remaining aryl radical attacks the sidewall and forms a covalent bond, and (B) a density of states (DOS) diagrams for both metallic and semiconducting SWNTs.

For SWNTs in particular, the dominant factor in sidewall reactivity in many cases turns out to be the availability of electrons for donation by the SWNT. For mod 3 residual (i.e., $|n-m|$)=zero, i.e., metallic SWNTs, there are levels that cross the Fermi level, and electrons are readily available. For mod 3 residual=1 or 2, i.e., semiconductor SWNTs, the highest lying electrons are in the van Hove valence bands typically ½ eV or more below the Fermi level. See FIG. 4B for density of states (DOS) diagrams for both metallic and semiconducting SWNTs. In addition, larger diameter SWNTs show longer wavelength absorption, indicating the van Hove singularity is closer to the Fermi level. Thus, reactants that depend on the availability of electrons can be made to selectively attack the nanotube sidewalls. Aryl diazonium salts are one such class of reactants, as shown in FIG. 4A. As this diazonium moiety migrates to the surface of the SWNT, the positive charge on the nitrogen end attracts an electron from the nanotube which stabilizes the transition state as the nitrogen molecule departs. Then the remaining aryl radical attacks the sidewall and forms a covalent bond.

Figure 5:
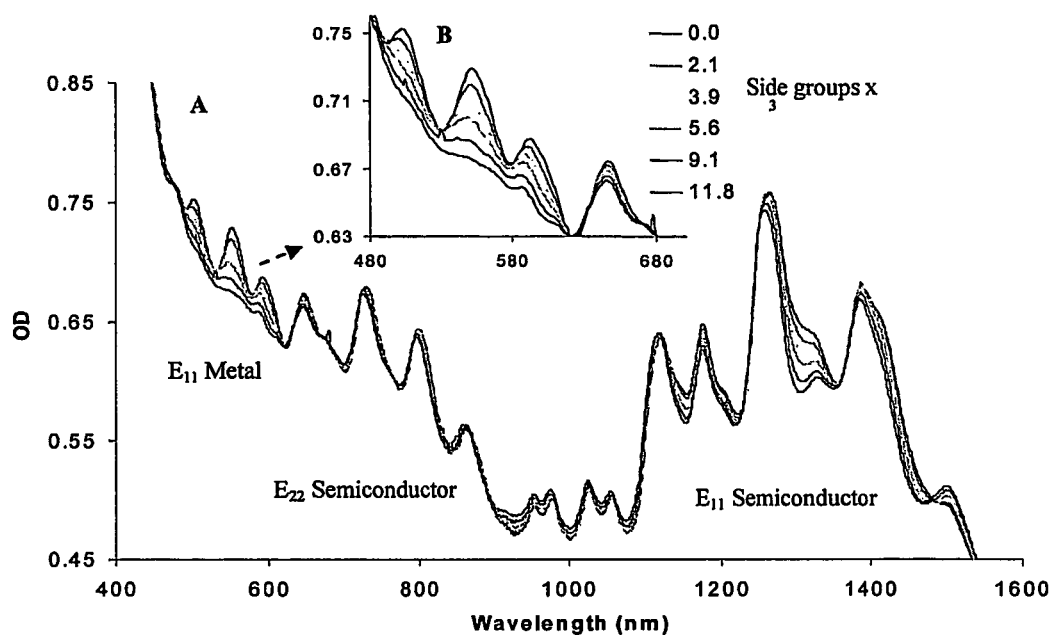
FIG. 5 illustrates absorption spectra of solutions of selectively functionalized SWNTs, wherein absorption peaks due to metallic SWNTs (ca. 500 nm) are flattened, but the first van Hove absorption features of the semiconductor SWNTs in the near infrared are hardly affected.

The readily available electron from the metallic SWNTs makes the reaction shown in FIG. 4A much faster than for the semiconductor SWNTs, hence with measured addition of the reagent, essentially only the metallic SWNTs will become derivatized. The strain of the first side group makes adjacent carbons more reactive, and so the nanotube continues to accumulate derivatization [Strano et al., *Science*, 2003, 301, 1519-1522]. The result is a remarkable and essentially complete selective functionalization of the metallic SWNTs, whereas the semiconductor SWNTs are virtually untouched. This is readily seen in the absorption spectra of the solution, as shown in FIG. 5, where the metallic absorption peaks ~500 nm are flattened, but the first van Hove absorption features of the semiconductor SWNTs in the near IR are hardly affected. In addition, the Raman radial breathing mode (RBM) spectra show some propensity for further selective derivatization within the metallic group.

Such above-described selective derivatization can lead to sorting of CNTs by type. In some embodiments, the functionalization improves the solubility in solvents such as N,N-dimethylformamide (DMF), so that the metallic SWNTs may be extracted. In addition, reactive functional groups may be attached to the tails of the aryl derivatives (already attached to the SWNTs), which in turn can be attached to, e.g., water soluble polymers that will keep those nanotubes in suspension when the micelle-forming matter is removed and the insoluble semiconductor SWNTs precipitate out. This is referred to herein as selective precipitation of selectively functionalized SWNTs.

Scale-up using a continuous flow sonicator [Sonics & Materials, Inc., Newtown, Conn.] has been recently shown by Applicants to effectively derivatize SWNTs with the previously mentioned diazonium chemistry, by-passing a tedious centrifuge step. This allows the process to be scaled up to larger amounts. Since the cloning of seeds bootstraps the production of the selected type of SWNTs, exceptionally large volume sorting is generally unnecessary.

In other embodiments, sorting is accomplished by a sequential "protonation" of semiconductor nanotubes, starting with the largest, so that chiral selectivity within the semiconductor group appears reasonable [O'Connell et al., *Science*, 2002, 297, 593-596]. Once the metallic SWNTs are removed, semiconductor SWNTs of different diameters can be selectively functionalized with diazonium chemistry.

Some or other embodiments employ a superacid, e.g., chlorosulfonic acid, in the sorting process. The acid interaction with the nanotube sidewall appears to exhibit dependence on the availability of electrons and, correspondingly, chirality and diameter. A superacid extraction of SWNT material shows some chirality differentiation between the extract and the residue. The advantage here is that the acid can be removed with vacuum distillation leaving nanotubes enriched in metallic SWNTs. This separation process is of interest because of its simplicity and easy scalability.

In some embodiments, the CNTs are also sorted by length using one or more of the following techniques: chromatography [Zheng et al., *Nature Mater.*, 2003, 2, 338-342], electrophoresis [Krupke et al., *Science*, 2003, 301, 244-347], selective precipitation [Chattophadhyay et al., *J. Am. Chem. Soc.*, 2003, 125, 3370-3375], filtration, and centrifugation [Chen et al., *Nano Lett.*, 2003, 3, 1245-1249], and others as are known in the art.

Preparation of Cut Tubes and Metal Catalyst Precursor for Docking

Generally, but not always, docking the CNTs to metal catalyst precursors generally first involves a chemical derivatization of the CNT ends. These CNT ends are derivatized so as to comprise end functionality capable of coupling (attaching) to an organometallic or other species comprising metal catalyst precursor species, generally referred to herein as metal clusters. Once attached, these catalyst precursor materials can be reductively "docked" to the CNT end by heating in a reducing atmosphere (e.g., $H_2$). Finally, carbon feedstock gas is introduced at suitable growth conditions to grow (i.e., replicate) the seed material.

Initial attachment, as described above, leads to the formation of complexes comprising a CNT and one or two metal catalyst precursors (clusters) attached at one or both ends of the CNT. Such "CNT-cluster complexes" are essentially seed precursors, as they are not "active" until they are activated by a reductive docking, via thermolysis, in a reducing atmosphere. Thus, such CNT-cluster complexes are also referred to herein as "inactive seeds."

Figure 6:
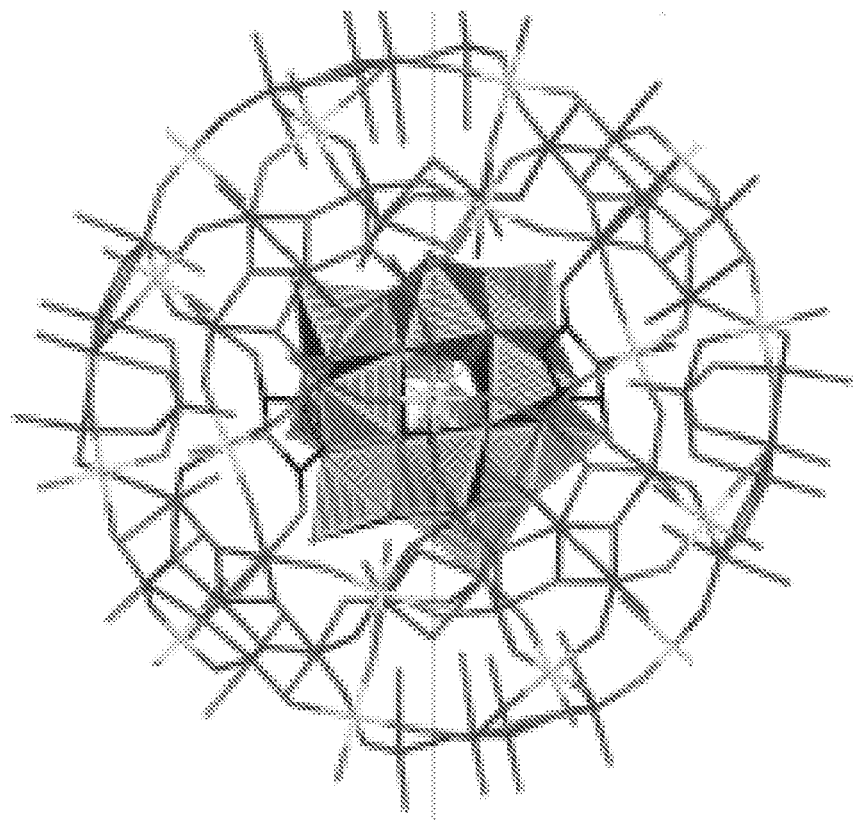
FIG. 6 illustrates the iron-molybdenum oxide cage surrounding the inner $MO_{12}P$ Keggin anion of $H_xPMo_{12}O_4 \subset H_4Mo_{72}Fe_{30}(O_2CMe)_{15}O_{254}(H_2O)_{98}$.

As an exemplary metal catalyst precursor, a molecular cluster that contains molybdenum and iron, $Fe_{30}Mo_{70}$ has been recently shown to be an excellent catalyst for SWNT growth [An et al., *J. Am. Chem. Soc.*, 2002, 124, 13688-13689]. Additionally, the iron molybdate cluster, $H_xPMo_{12}O_{40} \subset H_4Mo_{72}Fe_{30}(O_2CMe)_{15}O_{254}(H_2O)_{98}$ ("FeMoC"), is a keplerate cation around a central Keggin anion, [Müller et al., *Angewandte Chemie Int. Ed.* 2000, 39, 3413-3417], and is another suitable metal catalyst precursor cluster—particularly for forming the above-described CNT-cluster complexes. FIG. 6 illustrates the iron-molybdenum oxide cage surrounding the inner Keggin anion. The net charge on the cluster is zero. The FeMoC metal cluster is an exemplary organometallic species for the above-described embodiments, but such processes are by no means limited to the use of FeMoC.

The FeMoC cluster is soluble in water and has 60 water molecules coordinated to metal ion sites. It is soluble in water and methanol as well as some organic solvents such as dimethylformamide (DMF). It is believed that water can be displaced from the coordination sphere with amine groups. The cluster appears to be ideally suited for attaching and docking docking to cut SWNTs to form SWNT seeds. It is easily made and stable for long periods of time in water. Other molecular metal clusters similar to FeMoC and comprising suitable metal species can also be used as metal catalyst precursors-provided they can generate nanometer sized metal clusters capable of attaching to the nanotube ends to serve as growth catalysts.

The method described by Müller et al. for making FeMoC, however, is inefficient, and the reaction product can display variable composition, neither attribute being ideal for scale-up. As mentioned above, FeMoC consists of two components, a central Keggin ion $[H_xPMo_{12}O_{40}]^{n-}$, and a surrounding keplerate cage $[H_4Mo_{72}Fe_{30}(O_2CMe)_{15}O_{254}(H_2O)_{98}]$. The Keggin ion is blue and soluble in water; the keplerate cage is yellow with low solubility in water; FeMoC is green. Based upon the known method of purification (vide infra), it is common for quantities of the keplerate cage to contaminate the FeMoC samples. Such contamination can alter the Fe:Mo ratio of the cluster resulting in a potential variation in catalyst activity and growth rate. In addition, the FeMoC is insoluble in most solvents that it does not react with, and shows slow reaction with suitable functional groups. This is, in part due to the presence of coordinated water on the surface of the FeMoC.

In order to prepare FeMoC on a large scale, a simpler purification procedure and a chemical alteration of the FeMoC was developed to allow for its ready reaction with functionalized SWNTs.

Whereas the known chemistry of FeMoC suggests that the FeMoC may be purified by its precipitation from water solution, Applicants have found, surprisingly, that a significant additional yield may be obtained by the following protocol. The crude FeMoC reaction mixture is prepared by the reaction of $H_3[P(Mo_2O_{10})_4]$ with $FeCl_2$, $Na_2MoO_4$ and $MeCO_2H$, which is then reduced to dryness. The resulting solid is washed with water to remove the blue Keggin ion to yield a pale green solid that is insoluble in neutral water. The pale green solid is extracted into ethanol (EtOH) using a Soxhlet extraction apparatus. Whereas a typical extraction will yield a dilute solution, Soxhlet extraction results in a concentrated solution of a modified FeMoC. Thermogravimetric and mass spectral analysis show that the modification results from the substitution of approximately thirty water ligands for an equal number of EtOH ligands. This "activated FeMoC" has a solubility of approximately 12 mg per $cm^3$ in EtOH.

A further advantage of the above-described method of purification, in relation to some embodiments of the present invention, is that the EtOH ligands are much easier to remove from the coordination sphere of the FeMoC than the coordinated water ligands. Thus, subsequent reactions with the activated (end-derivatized) CNTs are facilitated. The EtOH ligands are readily displaced by ligands containing suitable substituents such as carboxylate groups, thiols, and pyridines, i.e., species that can easily be generated on CNT ends. The extent of the substitution is dependent on the relative strength and binding constant of the ligand.

As an alternative to the use of an easily displaced ligand (e.g., EtOH), the functionalization of the outer surface of FeMoC clusters with molecular linkers capable of interacting with the functionality on the activated CNT ends can also be carried out. In a typical example, FeMoC may be activated (functionalized) by reaction with 2-aminoethanethiol hydrochloride (2-AET.HCl). The resulting activated FeMoC can react with carboxylate functionalized CNTs. Alternative ligands include those based upon other carboxylic acids (including benzoic acid), pyridines (lutidene and picoline), and thiols.

In some of the above-described embodiments, the metal catalyst precursor material is purified prior to attachment to the CNTs. Such purification can ensure proper stoichiometry in catalyst precursors comprised of two or more different metals.

Preparation of the ends of cut tubes typically involve opening the ends of the cut tubes (if they were not already opened in the cutting process), and ensuring that carboxylate, carboxylic acid, and/or quinine groups exist on the ends of the tubes. Carboxylic groups can be readily functionalized with standard organic chemical methods. See Liu et al., *Science*, 1998, 280, 1253-1256. In some embodiments, the present invention includes the formation of functional groups on the ends of the SWNT that comprise thiol groups, for example, oxalyl chloride or thionyl chloride (to afford the terminal acid chloride functionalities) followed by reaction with $\alpha,\omega$-dithiols such as benzene-1,4-dithiol or 1,8-octanedithiol, etc. Generally, the metal catalyst precursor species (metal cluster) should be capable of attaching to the CNT ends via chemical bonding and/or other complexation.

The ability to grow nanotubes from seeds depends on having a highly efficient method for docking nanometer sized metal cluster to the ends of cut nanotubes. This generally requires that all cut nanotubes be accessible for end chemistry. The best way to ensure access is to extensively functionalize the sidewalls of seeds with a group that gives good solubility in a variety of organic solvents. Recent free radical chemistry developed at Rice University [Ying et al., *Org. Letters*, 2003, 5, 1471-1473; Bahr et al., *J. Am. Chem. Soc.*, 2001, 123, 6536-6542; Khabashesku et al., *Acc. Chem. Res.*, 2002, 35, 1087-1095] has demonstrated that excellent solubility is achieved for SWNTs when they are fully functionalized. Such sidewall functionalization can also serve to protect the sidewalls of the cut CNTs from reaction with metal catalyst precursors during the formation of seeds. Such sidewall functionality can also be removed via thermolysis and/or other chemical methods. See, e.g., Dyke et al., *Syn. Lett.*, 2004, 155-160.

Standard organic reactions can be applied to the end groups of the cut tubes to create amine-terminated or other groups that have a favorable interaction with metal clusters such as the FeMoC metal cluster previously mentioned. The FeMoC clusters can also be functionalized to further enhance selective docking to the ends of cut nanotubes. The procedures allow clusters that are not docked to be washed away leaving only metal clusters that are docked to nanotube seeds. Docking can be confirmed with cryogenic transmission electron microscopy (cryoTEM). The docked clusters can then be reduced to the metallic state in a reducing environment such as hydrogen.

While FeMoC has been put forth as an exemplary metal catalyst precursor material (cluster), such precursors are by no means limited to FeMoC. Any metal cluster capable of attaching to a CNT end and functioning as a catalyst under growth conditions will work, e.g., iron clusters precipitated by "inverse micelle" methods. See Park et al., *J. Am. Chem. Soc.*, 2000, 122, 8581-8584. Additionally, in some embodiments, metal catalyst precursor material attaches first to the sidewalls of the CNTs, then migrates to the ends of the CNTs to promote growth under growth conditions. In some embodiments, such initial sidewall attachment results from covalent or other chemical bonding.

Attachment of Catalysts to Cut Tubes and Reductive Docking

Generally, once prepared, the activated CNTs and the metal cluster are attached in a solution-phase process. Functionalization of the CNTs can facilitate finding a suitable common solvent for both species so that they can associate (e.g., react) to form CNT-cluster complexes.

In some embodiments, attachment of metal clusters to the ends of cut nanotubes can be as simple as the displacement of coordinated water (or EtOH) with carboxylic groups present on the open ends of cut CNTs. Alternatively, the cut CNT ends can be functionalized with groups that are terminated by an amine group.

The reaction of an activated (i.e., functionalized) metal catalyst precursor cluster with end-functionalized CNTs is carried out under conditions to optimize the formation of the CNT-cluster complex. The presence of residual metal catalyst precursor (metal cluster) and/or CNT can be used to determine the optimum reaction conditions, and the optimum CNT:metal cluster reaction ratio.

As an example, a $CHCl_3$ solution of carboxylate end-functionalized (activated) SWNT may be reacted with an athanolic solution of FeMoC(EtOH) at 55° C. to form a CNT-cluster complex. If this reaction is carried out at room temperature, or in DMF, little or no reaction is observed and significant quantities of unreacted FeMoC are observed. These results are summarized in Table 1.

TABLE 1

Summary of the extent of reaction between FeMoC and activated SWNTs.

| | % FeMoC attached | % SWNTs with FeMoC attached | % Attachment at 2 ends |
|---|---|---|---|
| Room temperature | 12 | 13 | 0 |
| 4 hours @ 55° C. | 65 | 50 | 11 |

The optimum CNT:metal cluster molar ratio for the above reaction will depend on the length of the SWNTs as well as the percentage of SWNTs with activated ends. As an example, functionalized HiPCo SWNTs (Carbon Nanotechnologies, Inc., Houston, Tex.) with an estimated average length of 500 nm were reacted with FeMoC(EtOH) in a 5:1 ratio. Atomic force microscopy (AFM) measurements indicate that essentially all of the FeMoC has reacted, but a majority of the SWNTs do not show attachment to FeMoC. Performing the reaction with a FeMoC(EtOH):SWNT ratio of 20:1 resulted in a significant increase in the percentage of SWNTs attached to a FeMoC.

In alternative embodiments, the functionalized (activated) SWNT may be reacted with one or more metal compounds to form the CNT-cluster complex in situ. As an example, the carboxylate functional groups on the activated SWNT may be reacted with a tranisition metal (TM) halide to produce a complex that can undergo subsequent reaction with other metal-containing components. The structure and composition of the resulting complex can be controlled by careful choice of reagents, the reaction conditions, as well as the chirality and diameter of the SWNTs being amplified. Thus, different metal clusters can be attached to CNTs to form CNT seeds with different characteristics and properties. An advantage of this method is that the CNT-cluster complexes may be separated based upon the size, charge, coordination chemistry or electrochemistry of the particular metal species. In this manner, CNTs with different diameters and/or chirality may be separated. That is, sorting by type can, in some embodiments, be carried out after formation of CNT-cluster complexes.

It is understood that the CNT-cluster complex, as formed by the methods discussed above, is not suitable for the growth of the SWNT directly, but must undergo an activation step (reductive docking) to generate unfunctionalized (when previously functionalized) CNTs and an active (i.e., reduced) growth catalyst. This activation step may be performed during the initial stages of CNT growth or as a separate step.

As an example, the FeMoC must be reduced to yield a suitable particle of Fe/Mo alloy. This reduction may be carried out at elevated temperatures under hydrogen. Heating FeMoC(EtOH) under an inert atmosphere such as nitrogen or argon to ca. 200° C. results in the loss of coordinated EtOH and water. Further heating to ca. 370° C. results in the elimination of the organic components (e.g., the acetate groups) and strongly complexed water to give a metal oxide particle. Heating this material under hydrogen ($H_2$) to ~700° C. results in the reduction of the metal oxide and the formation of a metal alloy particle and the evolution of water. Such heating can also serve to defunctionalize (e.g., deprotect) the CNT sidewalls (if they were previously functionalized).

When the CNT-cluster complex is heated under suitable conditions, some part of the CNT that is attached to the metal catalyst will be dissolved/reacted with the metal. As a consequence the metal catalyst and CNT will remain bound (as a seed) for subsequent CNT growth.

In some embodiments, the CNT seeds are purified to remove excess catalyst. This is important since excess, unattached catalyst can allow for the uncontrolled growth of unseeded CNTs. Generally, such purification is done prior to reductive docking.

Depending on the embodiment, the seeded growth methods can be carried out on a support or in a gas stream as an aerosol of CNT seed particles. Thus, re-growth can be carried out with CNT seeds dispersed on supports or by injection of seeds into the gas phase of a growth reactor, typically from a solvent-based dispersion.

Growth of Seeds on Supports

Figure 7:
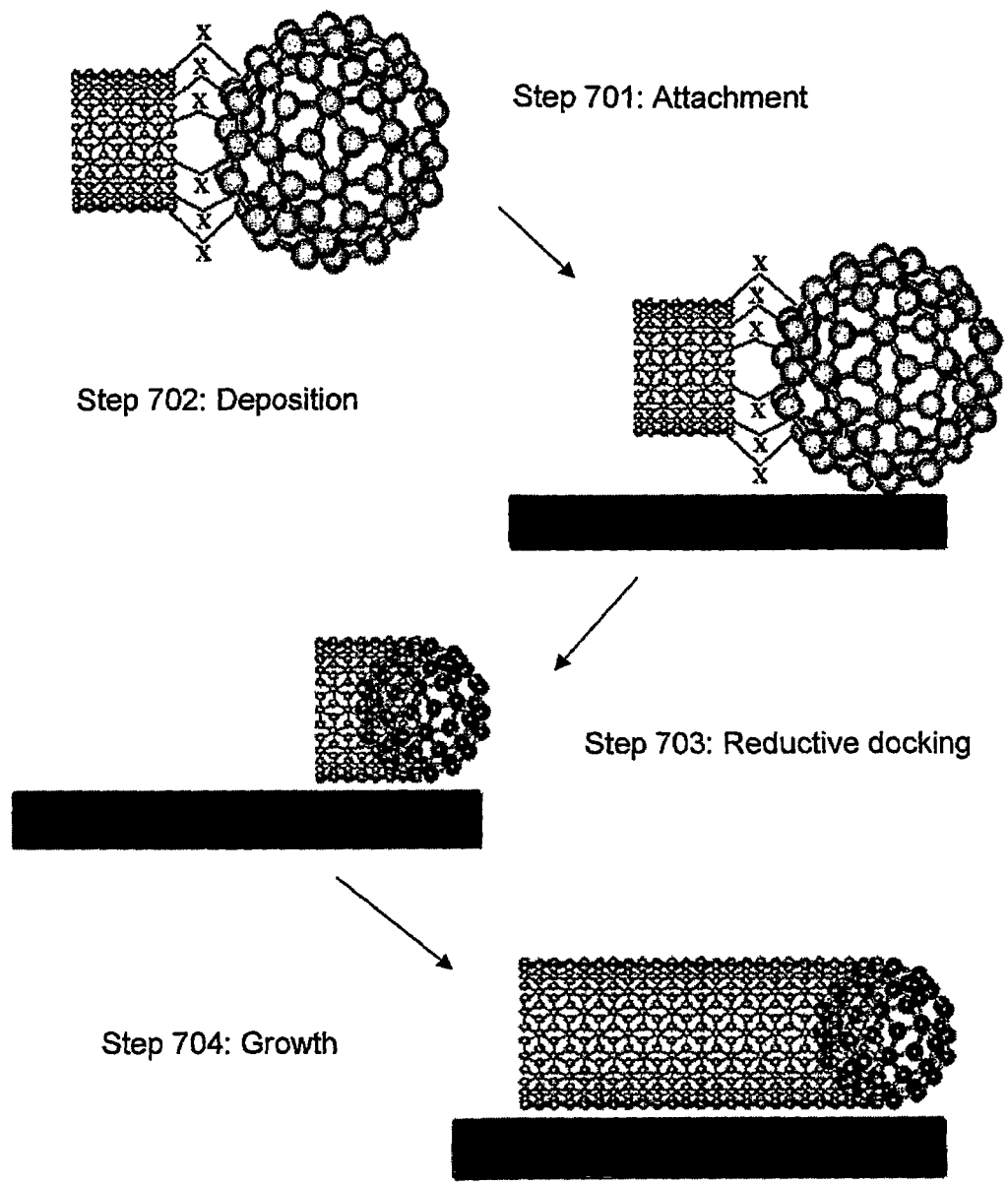
FIG. 7 illustrates growth of SWNTs from seeds, in graphic stepwise fashion, in accordance with embodiments of the present invention.

The growth of SWNTs from seeds is illustrated in FIG. 7. Referring to FIG. 7, a nanotube seed with its docked catalyst particle (shown attached as a SWNT-cluster complex in Step 701) is dispersed on a support (Step 702). The supported SWNT-cluster complex (inactive seed) is then exposed to a reducing atmosphere in order to reductively dock the metal oxide particle to the end carbon atoms of the nanotube (Step 703) and form a seed. This will eliminate any possibility of spontaneous nucleation. The docked seeds are subsequently grown in a carbon rich environment, such as CO and $H_2$ at one atmosphere and 700° C., as shown in Step 704.

Figure 8:
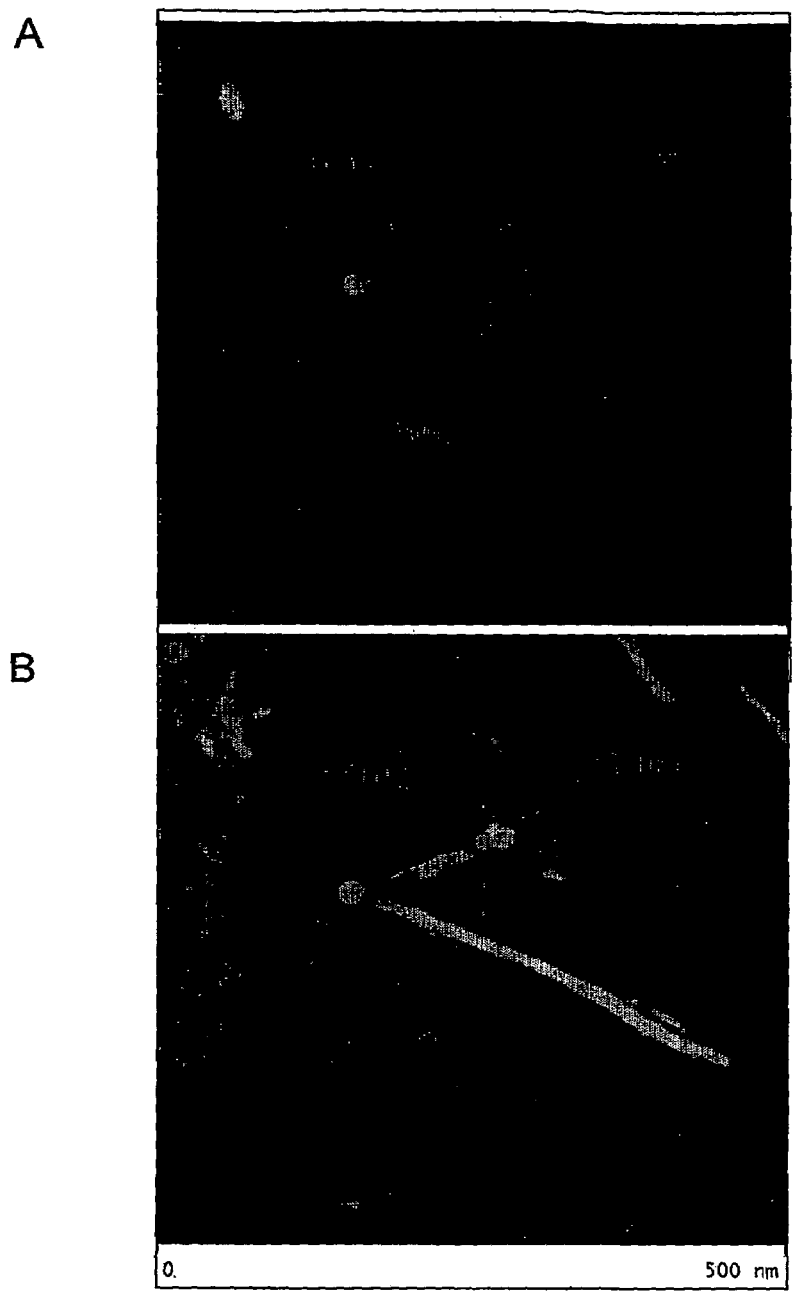
FIGS. 8 A and B illustrate how the growth of specific seeds can be monitored on surfaces with atomic force microscopy (AFM).

In some embodiments, the growth of seeds is carried out on silicon wafer substrates (or other suitably flat surface) where the growth of specific seeds can be monitored with atomic force microscopy (AFM), as shown in FIGS. 8A and 8B. In other embodiments, the substrate is selected from the group consisting of silica, alumina, magnesium oxide, and combinations thereof. Cut nanotubes with a docked catalyst particle can be dispersed on fumed alumina, commercial nano-titanium dioxide, and high surface area magnesium oxide. In order to enhance the dispersion of inactive seeds, metal oxide surfaces can be coated with amine-terminated functional groups that will bind to the metal cluster and pin the nanotube seeds to the support surface. Dispersion can be by way of spin-casting the CNT seeds (generally in their inactive form) from solution onto the substrate surface, and growth methods can be by way of one or more of a variety of suitable methods, e.g., Hafner et al., Chem. Phys. Lett., 1998, 296, 195-202.

Growth of Seeds by Injection into Gas Environment

Direct injection of nanotube seeds, in either their active or inactive form, into a hot carbon rich gas stream where the seeds are rapidly dispersed as individuals in the hot reactor gas provides for a scalable growth process. Since the seeds are not volatile they generally must be transported into the reactor by a liquid stream in which they are solubilized or suspended. However vaporization of micron-sized liquid droplets can cause agglomeration of the seeds present in the droplet. In some embodiments, a solution to this problem is the use of supercritical $CO_2$ as the liquid carrier, wherein the seeds are individually suspended in a surfactant or dispersed on nano-oxide particles. In other embodiments, aggregation can be prevented with a form of electrospray, so that particles fragment rather than grow due to charge repulsion as they form. As above, growth conditions in the reactor can be by way of a variety of suitable methods, e.g., Nikolaev et al., Chem. Phys. Lett. 1999, 313, 91-97; Bronikowski et al., J. Vac. Sci. & Tech. A, 2001, 19, 100-1805.

An exemplary application potentially benefiting from such seeded growth methods is hydrogen storage. Of all carbon materials, single-wall carbon nanotubes provide the highest possible surface to mass ratio, as well as access to both the inner and outer surfaces of open-ended SWNTs. In principal, because of its surface-to-mass ratio, SWNTs should be the best possible carbon material for hydrogen storage. The optimum adsorption of such $H_2$ on (or within) SWNTs is likely a function of the SWNT diameter and chirality. Finding the optimum type and generating bulk quantities of this precise population will thereby increase the utility of SWNTs in hydrogen storage applications.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill in the art should, in light of the present disclosure, appreciate that many changes can be made in the specific embodiments that are disclosed and still obtain a like or similar result without departing from the spirit and scope of the invention.

EXAMPLE 1

This Example serves to illustrate how SWNTs can be purified, dispersed, and modified for reaction with a metal catalyst precursor.

In a typical procedure, raw carbon nanotubes (as-produced material from the reactor) are first soft-baked by a published procedure [Liu et al., Science, 1998, 280, 1253-1256]. This is a purification step, performed to remove exogenous iron and amorphous carbon. The purified carbon nanotubes are then treated with piranha (4:1 ratio of conc $H_2SO_4$:30% $H_2O_2$) to give carboxylic acid terminated carbon nanotubes. See Liu et al., Science, 1998, 280, 1253-1256. The piranha-treated carbon nanotubes are then suspended in water that is facilitated by surfactants. The nanotubes, surfactants, and water are combined, then homogenized, sonicated, and centrifuged. See O'Connell et al., Science 2002, 297, 593. This gives carbon nanotubes that are dispersed in water as predominately individuals. The nanotube solution is then reacted with a diazonium salt, such as $F_4B^-N_2^+$—$C_6H_4$-$^tBu$, as described in Dyke et al., Nano Letters, 2003, 3, 1215, by adding an excess of an appropriate diazonium salt. The pirhana-treated, functionalized carbon nanotubes are then filtered and washed to remove the excess salt, water, and surfactant. This material [pir(p)SWNT-$C_6H_4$-$^tBu$] is then resuspended in a suitable solvent to attach a metal cluster to the end of the SWNTs through bonding with the carboxylic acids that terminate the nanotube.

EXAMPLE 2

This Example serves to illustrate how SWNTs can be surfactant-suspended in accordance with some embodiments of the present invention.

SWNTs (100 mg), purified by wet air oxidation and hexane extracted, are reacted with 50 mL piranha solution (4:1 ratio of conc $H_2SO_4$:30% $H_2O_2$). The reaction mixture is heated to 70° C. for 1 hour while stirring. After cooling to room temperature, the mixture is added to nanopure water (200 mL). Filtration, followed by washing with nanopure water (~200 mL), and addition of 1% SDS in nanopure water (200 mL). The suspension is homogenized for 1 hour, then sonicated for 10 minutes, after which the SWNTs are centrifuged (4 hours@29,000 rpm). The top 80% is decanted (i.e., the supernatant) to give a homogeneous solution of surfactant-suspended SWNTs.

EXAMPLE 3

This Example serves to illustrate how FeMoC can be prepared for use in some embodiments of the present invention.

$FeCl_2$ (10 g) is dissolved in water (75 mL). To this solution, $Na_2MoO_4$ (2.0 g) is added, followed by glacial acetic acid (10 mL), $HPMo_{12}O_{40}$ (2.5 g). Once addition is complete, the reaction mixture is adjusted to pH 2 with concentrated HCl. This solution is allowed to stand 45 minutes, then is filtered. Precipitation or evaporation is allowed to occur over a period of 2 days in an open flask. The resulting solid is washed with water and the solids dried. EtOH (250 mL, 200 proof) was placed in a round-bottomed flask (500 mL). Unpurified FeMoC crystals are placed in a filter and then the filter is placed inside the Soxhlet thimble. The Soxhlet extractor is connected to the round-bottomed flask and also to a condenser on top. The ethanol is refluxed overnight under nitrogen. A concentrated solution of FeMoC in ethanol is collected in the flask while yellow solid keplerate is retained in the filter. The EtOH solution is reduced in volume or to dryness to allow for the isolation of dark green crystals of FeMoC (EtOH). Concentration of FeMoC in ethanol in Soxhlet motherliquor: 17.8 mg/mL. Concentration of FeMoC dissolved in EtOH at RT: 12 mg/mL.

EXAMPLE 4

This procedure outlines the functionalization of the outer surface of FeMoC clusters with molecules of the linker 2-aminoethanethiol hydrochloride (2-AET.HCl). A 1.8 μM solution of FeMoC in ethanol was prepared by dissolving 31 mg FeMoC in 1 L of ethanol. A 25 mL aliquot of this cluster solution was placed into an addition funnel. Each FeMoC in the cluster solution is understood to be coordinated with 30 molecules of ethanol, which the 2-AET.HCl linker molecules must displace. For this reason, the concentration of 2-AET.HCl in the ethanolic linker solution should provide 30 molar equivalents of 2-AET.HCl for every single molar equivalent of FeMoC present in the cluster solution. The linker solution was prepared by first dissolving 2-AET.HCl (15.4 mg) in EtOH (100 mL) and then taking a 1 mL aliquot of this solution and diluting the aliquot with ethanol to a final volume of 25 mL. This final linker solution was placed in a round bottom flask, fitted with the addition funnel containing the cluster solution, and set to stir at 80° C. The cluster solution was added dropwise over the course of 15 min. After the addition was complete, the mixture was left stirring at 80° C. for an additional 15 min. The solution was then allowed to cool to room temperature. The resultant solution was either used as prepared or the functionalized clusters were isolated from the solvent using room temperature centrifugation at 4400 rpm for 5 min.

EXAMPLE 5

This Example illustrates a reaction between FeMoC (EtOH) and SWNTs in N,N-dimethylformamide (DMF) solvent.

A 5:1 ratio mixture of FeMoC(EtOH) in EtOH and pir(p) SWNT-$C_6H_4$-$^tBu$ in DMF was allowed to sit at room temperature overnight. The suspension was then spin-coated onto a highly-ordered pyrolytic graphite (HOPG) surface and imaged using AFM.

EXAMPLE 6

This Example illustrates a reaction between FeMoC (EtOH) and SWNTs in chloroform ($CHCl_3$).

A 5:1 ratio mixture of FeMoC(EtOH) in EtOH and pir(p) SWNT-$C_6H_4$-$^tBu$ in $CHCl_3$ was allowed to react at 55° C. for 4 hours. The suspension was spin-coated onto HOPG and imaged using AFM.

EXAMPLE 7

This Example illustrates a reaction between FeMoC (EtOH) and SWNTs in chloroform ($CHCl_3$), wherein the reaction mixture comprises a greater concentration of FeMoC (EtOH).

A 20:1 ratio mixture of FeMoC(EtOH) in EtOH and pir(p) SWNT-$C_6H_4$-$^tBu$ in $CHCl_3$ was allowed to react at 55° C. for 4 hours. The suspension was spin coated onto HOPG and imaged using atomic force microscopy (AFM), as shown in FIGS. 3 A and B.

All patents and publications referenced herein are hereby incorporated by reference. It will be understood that certain of the above-described structures, functions, and operations of the above-described embodiments are not necessary to practice the present invention and are included in the description simply for completeness of an exemplary embodiment or embodiments. In addition, it will be understood that specific structures, functions, and operations set forth in the above-described referenced patents and publications can be practiced in conjunction with the present invention, but they are not essential to its practice. It is therefore to be understood that the invention may be practiced otherwise than as specifically described without actually departing from the spirit and scope of the present invention as defined by the appended claims.

What is claimed is:

1. A process comprising the steps of:
   a) providing a plurality of carbon nanotubes;
   b) cutting the carbon nanotubes to provide cut carbon nanotubes comprising lengths on the order of tens of nanometers;
   c) sorting the cut carbon nanotubes by electronic type to provide sorted cut carbon nanotubes;
   d) selectively docking at least one end of at least some of the sorted cut carbon nanotubes to metal catalyst precursors to form carbon nanotube seeds; and
   e) growing the carbon nanotube seeds to form a carbon nanotube product of increased length, wherein the carbon nanotube product is of a single electronic type.

2. The process of claim 1, wherein the carbon nanotubes are selected from the group consisting of single-wall carbon nanotubes, multi-wall carbon nanotubes, double-wall carbon nanotubes, and combinations thereof.

3. The process of claim 1, wherein the carbon nanotubes are single-wall carbon nanotubes.

4. The process of claim 3, further comprising a step of cycling some of the single-wall carbon nanotubes product back into the process.

5. The process of claim 3, wherein the single-wall carbon nanotubes are cut by a method selected from the group consisting of partial fluorination, selective ozonation, superacid treatment, and combinations thereof.

6. The process of claim 3, further comprising a step of chemically derivatizing the cut single-wall carbon nanotubes.

7. The process of claim 6, wherein the cut single-wall carbon nanotubes undergo selective chemical derivatization based on electronic type.

8. The process of claim 7, wherein the selective chemical derivatization is used to sort the single-wall carbon nanotubes by electronic type, wherein the sorting comprises at least one of selective extraction or selective precipitation of the derivatized single-wall carbon nanotubes.

9. The process of claim 3, wherein the cut single-wall carbon nanotubes are sorted by electronic type by a method selected from the group consisting of selective chemical functionalization, selective protonation, superacid extraction, and combinations thereof.

10. The process of claim 3, wherein the metal catalyst precursor is a molecular cluster comprising a suitable metal catalyst.

11. The process of claim 3, wherein the metal catalyst precursor is FeMoC.

12. The process of claim 3, wherein the metal catalyst precursor is FeMoC(EtOH).

13. The process of claim 3, wherein docking the sorted cut single-wall carbon nanotube to metal catalyst precursors comprises an initial attachment.

14. The process of claim 11, wherein docking the sorted cut single-wall carbon nanotubes to the metal catalyst precursor comprises a displacement of coordinated water molecules with carboxylic groups on the single-wall carbon nanotube ends during the initial attachment.

15. The process of claim 12, wherein docking the sorted cut single-wall carbon nanotubes to the metal catalyst precursor comprises a displacement of coordinated ethanol molecules with carboxylic groups on the single-wall carbon nanotube ends during the initial attachment.

16. The process of claim 13 further comprising a step of purifying to remove unattached metal catalyst precursors.

17. The process of claim 3, wherein docking the sorted cut single-wall carbon nanotubes to the metal catalyst precursor further comprises reducing the metal catalyst precursor to its metallic state in a reducing environment.

18. The process of claim 17, wherein the reducing environment comprises hydrogen.

19. The process of claim 1, wherein a growth environment for growing the carbon nanotube seeds comprises a support surface.

20. The process of claim 3, wherein growing the carbon nanotube seeds comprises an injection process with subsequent nanotube seed aerosol formation.

21. The process of claim 1, wherein a growth environment for growing the carbon nanotube seeds comprises CO and $H_2$.

22. A process comprising the steps of:
  a) providing a plurality of carbon nanotubes that have been sorted by electronic type;
  b) forming carbon nanotube seeds from the plurality of carbon nanotubes, wherein forming carbon nanotube seeds comprises the steps of:
    1) selectively docking a metal catalyst precursor species to at least one end of the carbon nanotubes to form inactive carbon nanotube seeds, and
    2) reducing the product of step b1) to form active carbon nanotube seeds; and
  c) growing the carbon nanotube seeds in a growth environment to provide a carbon nanotube product comprising carbon nanotubes of a single electronic type.

23. The process of claim 22, wherein the carbon nanotubes are selected from the group consisting of single-wall carbon nanotubes, multi-wall carbon nanotubes, double-wall carbon nanotubes, and combinations thereof.

24. The process of claim 22, wherein the carbon nanotubes are single-wall carbon nanotubes.

25. The process of claim 24, wherein the single-wall carbon nanotube product is utilized for hydrogen storage, wherein the hydrogen storage comprises an adsorption of hydrogen molecules on or within the single-wall carbon nanotube.

26. The process of claim 22, further comprising a step of cutting the single-wall carbon nanotubes of pre-selected chirality and diameter with a cutting process so as to provide cut single-wall carbon nanotubes with lengths on the order of tens of nanometers.

27. The process of claim 26, wherein the single-wall carbon nanotubes are cut by a method selected from the group consisting of partial fluorination, selective ozonation, superacid treatment, and combinations thereof.

28. The process of claim 24, wherein the metal catalyst precursor is a molecular cluster comprising a suitable metal catalyst.

29. The process of claim 24, wherein the metal catalyst precursor is FeMoC.

30. The process of claim 24, wherein the metal catalyst precursor is FeMoC(EtOH).

31. The process of claim 24, wherein the metal catalyst precursor is an organometallic species.

32. The process of claim 24, wherein the reducing occurs in a reducing environment that comprises hydrogen.

33. The process of claim 22, wherein a growth environment for growing the carbon nanotube seeds comprises a support surface.

34. The process of claim 24, wherein placing the single-wall carbon nanotube seeds in a growth environment comprises an injection process with subsequent nanotube seed aerosol formation.

35. The process of claim 22, wherein a growth environment for growing the carbon nanotube seeds comprises CO and $H_2$.

36. A method comprising the steps of:
  a) providing a cut carbon nanotube sorted by electronic type with end functionality;
  b) selectively docking a FeMoC(EtOH) metal cluster to an end of the carbon nanotube;
  c) reducing the product of step b) to form an active carbon nanotube seed; and
  d) exposing the active carbon nanotube seed to growth conditions to form a carbon nanotube product of increased length and a single electronic type.

37. The method of claim 36, wherein the carbon nanotube is a single-wall carbon nanotube.

38. The process of claim 22, wherein the step of forming carbon nanotube seeds comprises disposing on the sidewalls of the carbon nanotubes a quantity of bonded metal catalyst precursor material sufficient to provide active catalyst metal atom clusters for growing carbon nanotubes under conditions that promote the generation of metal atoms and the migration of said metal atoms to the free ends of the said carbon nanotubes.

39. The process of claim 38, wherein the carbon nanotubes are selected from the group consisting of single-wall carbon nanotubes, multi-wall carbon nanotubes, double-wall carbon nanotubes, and combinations thereof.

40. The process of claim 38, wherein the carbon nanotubes are single-wall carbon nanotubes.

* * * * *

UNITED STATES PATENT AND TRADEMARK OFFICE
CERTIFICATE OF CORRECTION

PATENT NO. : 8,562,935 B2  Page 1 of 1
APPLICATION NO. : 10/575352
DATED : October 22, 2013
INVENTOR(S) : Smalley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2065 days.

Signed and Sealed this
Fifteenth Day of September, 2015

Michelle K. Lee
*Director of the United States Patent and Trademark Office*